US009021255B1

(12) United States Patent
Aharoni et al.

(10) Patent No.: US 9,021,255 B1
(45) Date of Patent: Apr. 28, 2015

(54) TECHNIQUES FOR MULTIPLE INDEPENDENT VERIFICATIONS FOR DIGITAL CERTIFICATES

(75) Inventors: Idan Aharoni, Tel Aviv (IL); Roy Hodgman, Wenham, MA (US); Ingo Schubert, Haldenwag (DE)

(73) Assignee: EMC Corporation, Hopkinton, MA (US)

( * ) Notice: Subject to any disclaimer, the term of this patent is extended or adjusted under 35 U.S.C. 154(b) by 264 days.

(21) Appl. No.: 13/537,904

(22) Filed: Jun. 29, 2012

(51) Int. Cl.
*H04L 29/06* (2006.01)
*G06F 21/33* (2013.01)

(52) U.S. Cl.
CPC ............... *H04L 29/06* (2013.01); *G06F 21/33* (2013.01)

(58) Field of Classification Search
CPC ...... H04L 29/06; H06F 21/645; G06F 21/645
USPC ..................... 713/156, 155, 157, 168; 726/10
See application file for complete search history.

(56) References Cited

U.S. PATENT DOCUMENTS

| | | | | |
|---|---|---|---|---|
| 6,308,277 | B1* | 10/2001 | Vaeth et al. | 726/10 |
| 6,374,357 | B1* | 4/2002 | Mohammed et al. | 726/5 |
| 7,571,461 | B2* | 8/2009 | Kwok et al. | 726/2 |
| 7,987,500 | B2* | 7/2011 | Rosenberg et al. | 726/4 |
| 8,595,815 | B2* | 11/2013 | Bolcer et al. | 726/10 |
| 8,627,065 | B2* | 1/2014 | Leggette et al. | 713/157 |
| 2002/0056043 | A1* | 5/2002 | Glass | 713/179 |
| 2002/0078355 | A1* | 6/2002 | Samar | 713/176 |
| 2003/0088771 | A1* | 5/2003 | Merchen | 713/175 |
| 2004/0100363 | A1* | 5/2004 | Lane et al. | 340/5.86 |
| 2005/0055242 | A1* | 3/2005 | Bello et al. | 705/2 |
| 2005/0289084 | A1* | 12/2005 | Thayer et al. | 705/67 |
| 2006/0010325 | A1* | 1/2006 | Liu et al. | 713/173 |
| 2006/0129825 | A1* | 6/2006 | Salomon et al. | 713/176 |
| 2006/0282663 | A1* | 12/2006 | Wray et al. | 713/158 |
| 2007/0168660 | A1* | 7/2007 | Little et al. | 713/158 |
| 2008/0209516 | A1* | 8/2008 | Nassiri | 726/3 |
| 2008/0263363 | A1* | 10/2008 | Jueneman et al. | 713/184 |
| 2009/0013384 | A1* | 1/2009 | Scurlock, Jr. et al. | 726/4 |
| 2009/0031127 | A1* | 1/2009 | Campbell et al. | 713/158 |
| 2009/0086977 | A1* | 4/2009 | Berggren | 380/279 |
| 2009/0210712 | A1* | 8/2009 | Fort | 713/175 |
| 2009/0319783 | A1* | 12/2009 | Thornton et al. | 713/156 |
| 2010/0023759 | A1* | 1/2010 | Langer | 713/156 |

(Continued)

OTHER PUBLICATIONS

Yeh et al., "Applying lightweight directory access protocol service on session certification authority", 2001.*

(Continued)

*Primary Examiner* — O. C. Vostal
(74) *Attorney, Agent, or Firm* — BainwoodHuang

(57) ABSTRACT

A method includes (a) receiving, at a computing device, a first certificate signing request (1CSR) from a certificate authority (CA), the 1CSR including an embedded second certificate signing request (2CSR), the 2CSR having been received by the CA from an entity seeking a signed certificate from the CA that validates an identity claim made by the entity in the 2CSR, the CA having performed a preliminary verification of the 2CSR prior to embedding it in the 1CSR, (b) verifying that the 1CSR came from the CA, (c) performing a verification procedure on the embedded 2CSR independent of the preliminary verification performed by the CA, to validate the identity claim made by the entity in the 2CSR, and (d) upon successfully validating the identity claim made by the entity in the 2CSR, sending a certificate to the CA, the certificate validating the identity claim made by the entity in the 2CSR.

15 Claims, 4 Drawing Sheets

(56) References Cited

U.S. PATENT DOCUMENTS

| | | | |
|---|---|---|---|
| 2011/0022835 A1* | 1/2011 | Schibuk | 713/153 |
| 2011/0213966 A1* | 9/2011 | Fu et al. | 713/158 |
| 2011/0231662 A1* | 9/2011 | Sato et al. | 713/176 |
| 2012/0089832 A1* | 4/2012 | Adelman et al. | 713/156 |
| 2012/0233457 A1* | 9/2012 | Zaverucha | 713/156 |
| 2013/0036303 A1* | 2/2013 | Himawan et al. | 713/158 |
| 2013/0132718 A1* | 5/2013 | Agrawal | 713/158 |
| 2013/0166907 A1* | 6/2013 | Brown et al. | 713/156 |
| 2014/0013110 A1* | 1/2014 | Thoniel et al. | 713/156 |
| 2014/0032913 A1* | 1/2014 | Tenenboym et al. | 713/176 |

OTHER PUBLICATIONS

Leavitt, "Internet Security under Attack: The Undermining of Digital Certificates", 2011.*

Wikipedia, the Free Enclyclopedia, "Certificate Signing Request"; <http://en.wikipedia.org/wiki/Certificate_signing_request>, 2 pages; Accessed Jun. 22, 2012.

Wikipedia, the Free Enclyclopedia, "Public key Certificate"; <http://en.wikipedia.org/wii/Public_key_certificate>, 7 pages; Accessed May 9, 2012.

Wikipedia, the Free Enclyclopedia, "Certificate Authority"; <http://en.wikipedia.org/wiki/Certificate_authority>, 6 pages; Accessed Jun. 22, 2012.

Wikipedia, the Free Enclyclopedia, "X.509"; <http://en.wikipedia.org/wiki/X.509#Structure_of_a_certificate>, 4 pages; Accessed Jun. 22, 2012.

M. Nystrom, et al.; Request for Comments: 2986, PKCS #10: Certification Request Syntax Specification, Version 1.7; <http://www.ietf.org/rfc/rfc2986.txt>, Nov. 2000, 13 pages; Network Working Group; Accessed May 13, 2014.

Wikipedia, the Free Enclycopedia, "Extended Validation Certificate"; <http://en.wikipedia.org/w/index.php?title=Extended_Validation_Certificate&oldid=473149056>, dated Jan. 25, 2012; 8 pages; Accessed May 22, 2014.

Hodgman, et al., U.S. Appl. No. 13/170,242; "Robust Message Encryption"; filed Jun. 28, 2011.

Dotan, et al., U.S. Appl. No. 13/434,257; "Authentication Involving Authentication Operations Which Cross Reference Authentication Factors"; filed Mar. 29, 2012.

Hodgman, et al., U.S. Appl. No. 13/537,617; "Mobile Trust Broker"; filed Jun. 29, 2012.

Wikipedia, the Free Enclycopedia, "Certificate Signing Request"; <http://en.wikipedia.org.wiki/Certificate_signing_request>, 2 pages; Accessed Jun. 22, 2012.

Wikipedia, the Free Enclyclopedia, "Public key Certificate"; <http://en.wikipedia.org/wii/Public_key_certificate., 7 pages; Accessed May 9, 2012.

Wikipedia, the Free Enclyclopedia, "Extended Validation Certificate"; <http://en.wikipedia.org/w/index.php?title=Extended_Validation_Certificate&oldid=473149056>, dated Jan. 25, 2012; 9 pages; Accessed May 22, 2014.

Hodgman, et al., U.S. Appl. No. 13/170,242 (RCE); "Robust Message Encryption"; Jun. 28, 2011.

Dotan, et al., U.S. Appl. No. 13/434,257; "Authentication Involving Authentication Operations Which Cross Reference Authentication Factors"; Mar. 29, 2012.

Hodgman, et al., U.S. Appl. No. 13/537,617; "Mobile Trust Broker"; Jun. 29, 2012.

* cited by examiner

TECHNIQUES FOR MULTIPLE INDEPENDENT VERIFICATIONS FOR DIGITAL CERTIFICATES

BACKGROUND

Computer operators running a web browser often desire security in interactions with web sites to ensure that communications with the web site are not intercepted by third parties and that the user is not inadvertently in contact with a malicious counterfeit web site. Digital certificates are used to allow web sites to distribute public keys to client browsers in such a way that the computer operators are able to ensure that the public key that its' web browsers are using are verifiably linked to the web site the computer operators intend to access.

An administrator of a web site is able to acquire a digital certificate by generating a public key/private key pair, sending a certificate signing request (CSR) with its public key to a certificate authority (CA), and receiving a certificate signed by the CA storing the public key back from the CA. In a conventional system, the CA, prior to signing and returning the certificate, takes steps to ensure that the CSR has been sent by the actual entity in control of the web site. Typically this is done by checking to make sure that the CSR came from the e-mail address registered to the domain name of the web site in the central Internet domain name servers.

SUMMARY

Unfortunately, the above-described conventional approach suffers from deficiencies. For example, if a hacker is able to hack into the CA, the hacker may be able to generate counterfeit certificates allowing the hacker to pose as an operator of a legitimate web site while stealing information. This has, in fact, happened to several CAs in recent years, threatening to destabilize trust in commercial web transactions.

In contrast to the above-described conventional approach, embodiments disclosed herein are directed to techniques for requiring multiple independent verifications of the identity of an entity seeking a digital certificate. Thus, even if a hacker is able to hack into one CA, a second verification performed by a different entity will prevent the hacker from using the CA to generate counterfeit certificates. In some embodiments, an independent computerized entity (referred to herein as a notary) is used to independently verify the identity of an entity requesting a certificate before a CA is able to generate the certificate. In other embodiments, multiple CAs are used to generate multiple certificates, while in yet other embodiments, multiple CAs are used to generate certificates with multiple signatures. In some embodiments, a notary is able to directly contact the legitimate administrator of the web site with reference to contact information previously stored with respect to the web site in order to prevent a hacker from changing the contact information for the web site.

In one embodiment, a method performed by a computing device is disclosed. The method includes (a) receiving, at the computing device, a first certificate signing request (1CSR) from a certificate authority (CA), the 1CSR including an embedded second certificate signing request (2CSR), the 2CSR having been received by the CA from an entity seeking a signed certificate from the CA that validates an identity claim made by the entity in the 2CSR, the CA having performed a preliminary verification of the 2CSR prior to embedding it in the 1CSR, (b) verifying, at the computing device, that the 1CSR came from the CA, (c) performing a verification procedure on the embedded 2CSR at the computing device independent of the preliminary verification performed by the CA, to validate the identity claim made by the entity in the 2CSR, and (d) upon successfully validating the identity claim made by the entity in the 2CSR, sending a certificate from the computing device to the CA, the certificate validating the identity claim made by the entity in the 2CSR. An apparatus and computer program product for carrying out this method are also provided.

In another embodiment, a method performed by a computing device is disclosed. The method includes (a) receiving, at the computing device, a first certificate signing request (1CSR) from an entity seeking a signed certificate from the computing device that validates an identity claim made by the entity in the 1CSR, (b) performing, at the computing device, a preliminary verification of the 1CSR by (1) determining whether a signature provided within the 1CSR by the entity was signed by a private key paired with a public key provided within the 1CSR and (2) determining whether the identity claim is valid based on a distinguished name included within the 1CSR, (c) in response to determining that the signature was signed by the private key paired with the public key and that the identity claim is valid based on the distinguished name, sending, from the computing device to a notarization entity, a second certificate signing request (2CSR), the 2CSR having the 1CSR embedded therein, (d) in response to sending the 2CSR to the notarization entity, receiving, at the computing device, a notarization certificate signed by the notarization entity, and (e) in response to receiving the notarization certificate signed by the notarization entity, sending a signed certificate from the computing device, to the entity, the signed certificate validating the identity claim made by the entity in the 1CSR. An apparatus and computer program product for carrying out this method are also provided.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments disclosed herein are directed to techniques for requiring multiple independent verifications of the identity of an entity seeking a digital certificate. Thus, even if a hacker is able to hack into one CA, a second verification performed by a different entity will prevent the hacker from using the CA to generate counterfeit certificates. In some embodiments, a notary is used to independently verify the identity of an entity requesting a certificate before a CA is able to generate the certificate. In other embodiments, multiple CAs are used to generate multiple certificates, while in yet other embodiments, multiple CAs are used to generate certificates with multiple signatures. In some embodiments, a notary is able to directly contact the legitimate administrator of the web site with reference to contact information previously stored with respect to the web site in order to prevent a hacker from changing the contact information for the web site.

Figure 1:
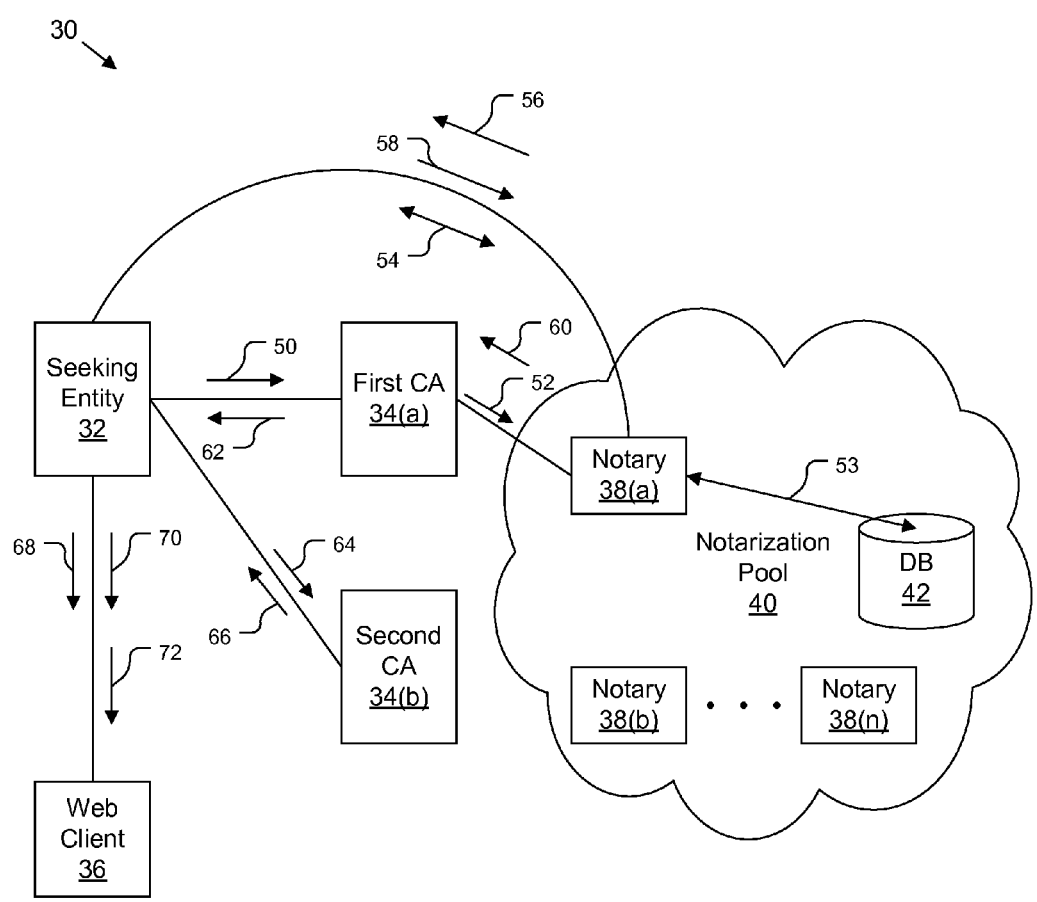
FIG. 1 illustrates an example system for use in conjunction with various embodiments.

FIG. 1 depicts an example system 30. System 30 includes a seeking entity 32. Seeking entity 32 is an entity that desires to obtain a digital public key certificate, such as, for example, a Transport Layer Security (TLS) certificate or a Secure Sockets Layer (SSL) certificate. The latest version of TLS is defined in RFC 5246, promulgated by the Internet Engineering Task Force (IETF), based in Fremont, Calif. The latest version of SSL is defined in RFC 6101, promulgated by the IETF. Typically, the seeking entity will operate a web site that utilizes TLS/SSL encryption over the Hypertext Transfer Protocol Secure (HTTPS) protocol in order to securely transmit a web site to a web client 36. The latest version of HTTPS is defined in RFC 2818, promulgated by the IETF.

Seeking entity 32 obtains a digital certificate from a certificate authority (CA) 34, such as, for example, first CA 34(a). In various embodiments, first CA 34(a) may communicate with a notary 38, for example, notary 38(a), drawn from a notarization pool 40, so that the notary 38(a) can independently verify the digital certificate request for additional security. A notary is a computing device (see FIG. 2, below) operated by a distinct entity than the CA 34(a) and under entirely separate control. Notary 38(a) may perform this independent verification with reference to a database (DB) 42, which is maintained in a distributed fashion across the notarization pool 40. In other embodiments, upon receiving a certificate from first CA 34(a), seeking entity may engage in further communication with a second CA 34(b) so that the second CA 34(b) can independently verify the digital certificate request for additional security. The various entities, 32, 34(a), 34(b), 36, 38(a), 42, etc., may communicate with each other by any known means of communication, although the communication is typically performed across a network, such as, for example, the Internet.

In operation, seeking entity 32 sends a first certificate signing request (CSR) 50 (referred to as CSR1) to a CA 34(a) in order to request a digital certificate 62 (referred to as cert2). A CSR is typically sent in accordance with the public-key cryptography standard (PKCS) #10, defined in RFC 2986, promulgated by the IETF (although, in some embodiments, a modified version of PKCS #10 may be used in accordance with PKCS #7, defined in RFC 2315, promulgated by the IETF).

In some embodiments, CA 34(a), upon initially verifying the identity of the seeking entity 32 (e.g., using a domain validation procedure, as is well-known in the art), sends a second CSR 52 (referred to as CSR2) to a notary 38(a) in order to request another digital certificate 60 (referred to as cert1). In some embodiments, CSR1 is embedded within CSR2. Notary 38(a) is an entity which is configured to perform additional verification procedures independent of the verification done by CA 34(a). In some embodiments, notary 38(a) may itself be a CA 34 having augmented functionality, but even in these embodiments, a notary 38(a) must not serve as a notary for itself in its capacity as a CA 34 and it should also not serve as a notary for any CA 34 under common control. Typically, notary 38(a) is randomly chosen from a set of notaries 38(a), 38(b), . . . , 38(n) within notarization pool 40. Each notary 38 within notarization pool 40 accesses DB 42 to keep centralized records of all notarization requests and to confirm that new records are consistent with old requests. For example, for any given domain name, DB 42 stores a list of all contact e-mail addresses associated with that domain in all previous certificate CSRs. Typically, the contact e-mail addresses associated with a domain does not change, so, when a previously-unused e-mail address is used, it may trigger suspicion and heightened verification procedures.

In some embodiments, notary 38(a) sends a domain name associated with the seeking entity 32 from CSR1 50 (e.g., www.example.com) to DB 42 in a checking operation 53, which returns a list of all contact e-mail addresses (e.g., admin@example.com) previously used by that domain in previous certificate requests. Notary 38(a) may then compare the received list of contact e-mail addresses with the contact e-mail address stored within CSR1 50. If it matches an entry on the list, it proceeds, but, if it is a new address, in some embodiments, the verification fails, and notary 38(a) refrains from issuing digital certificate cert1 60 to CA 34(a). In other embodiments, notary 38(a) uses both the new address and the stored contact e-mail addresses for further verification. Thus, in one embodiment, notary 38(a) engages in a bidirectional verification procedure with seeking entity 32 by sending verification e-mail messages to both the new address and the stored contact e-mail addresses, the e-mail messages indicating that the seeking entity 32 has requested a certificate. If the CSR1 50 is fraudulent, the e-mail messages to all of the previously-used contact e-mail addresses as well as the new address should alert the legitimate owner of the domain in case fraud is being perpetrated. In some embodiments, notary 38(a) sends a third CSR 56 (referred to as CSR3) to seeking entity 32 (in multiple copies, using all of the previously-used contact e-mail addresses as well as the new address), CSR2 52 being embedded within CSR3 56. If the seeking entity 32 in receipt of CSR3 56 agrees that it sent CSR1 to CA 34(a), then it signs CSR3 56, creating a digital certificate 58 (referred to as cert3), which it sends back to notary 38(a).

Upon successfully completing verification procedures, notary 38(a) sends digital certificate cert1 60 back to CA 34(a). Upon receiving cert1 60, CA 34(a) may send digital certificate cert2 62 back to seeking entity 32. In some embodiments, cert2 62 is the same as cert1 60 (i.e., a version of CSR1 50 signed first by CA 34(a) and then by notary 38(a)), while in other embodiments, cert2 62 is a version of CSR1 50 signed only by CA 34(a), the signature being applied only after receiving cert1 60, which attests to the approval of notary 38(a).

In some embodiments, upon receiving cert2 62, seeking entity sends another CSR 64 (referred to as CSR4) to a second CA 34(b) in order to request another certificate 66 (referred to as cert4). In some embodiments, CSR4 64 includes cert2 62 embedded therein, so that cert4 66 is a version of cert2 that is subsequently signed by second CA 34(b) after second CA 34(b) independently verifies the information previously verified by first CA 34(a). In other embodiments, CSR4 64 is virtually identical to CSR1 50, and cert4 66 is merely a signed version of CSR4 64.

When web client 36 requests a secured web page from seeking entity 32 via HTTPS, seeking entity encrypts the page, and sends the encrypted page 68 to web client 36. Together with encrypted page 68, seeking entity also sends a primary certificate 70, i.e., cert2 62. In some embodiments, one or more additional certificate 72 is also sent. Depending on the particular embodiment, additional certificate 72 may include cert1 60; cert1 60 and cert3 58; or cert4 66.

Figure 2:
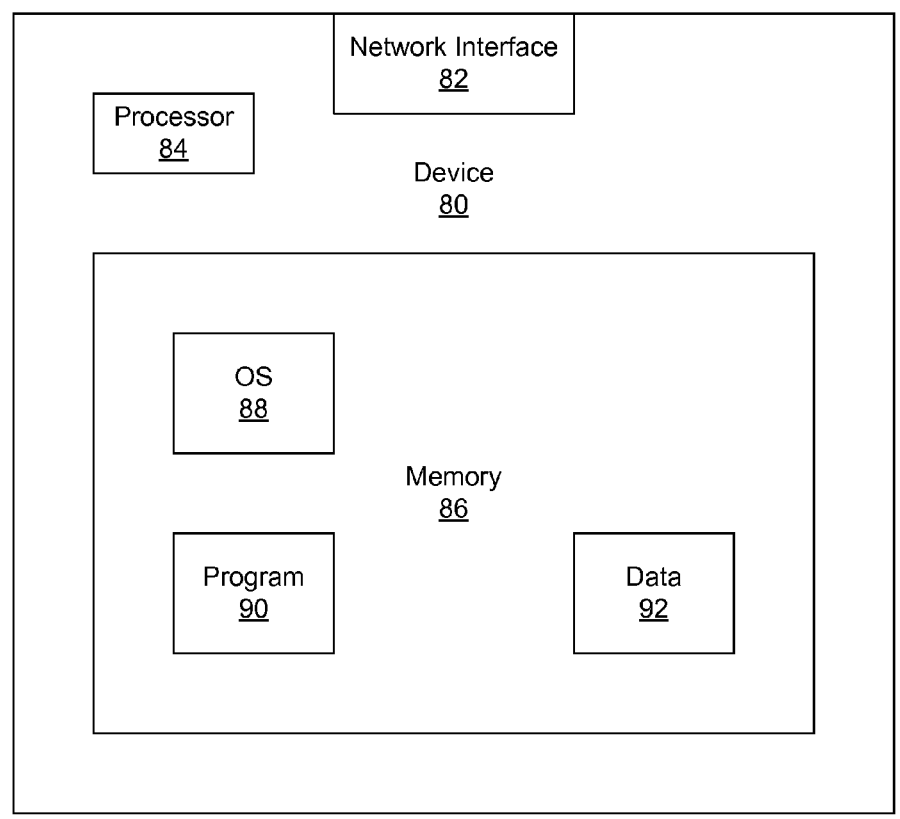
FIG. 2 illustrates an example apparatus according to various embodiments.

FIG. 2 depicts an example device 80. Device 80 is typical of seeking entity 32, CA 34, web client 36, and notary 38. Device 80 includes a network interface 82, a processor 84, and memory 86. Network interface 82 connects to a network, which allows communication with other devices 80. The network may be any kind of remote connection or network, such as, for example, a local area network, a wide area network, a storage area network, a point-to-point connection, a fabric of connections and switches, or the Internet. Processor 84 may be any kind of processing device for performing operations, such as, for example, a central processing unit, a microprocessor, a collection of multiple microprocessors, a digital signal processor, a field-programmable gate array, a collection of circuits configured to perform various operations, a storage processor, or another similar device or set of devices configured to perform operations.

Memory 86 may include, for example, system memory, cache memory, volatile memory, random access memory, non-volatile memory, flash memory, data storage devices, some combination thereof, or another similar device or set of devices configured to store running software and or data. Memory 86 stores executing and loaded code as well as associated data during execution, including an operating system 88, various drivers and applications, a computer program 90, and data 92 used by program 90. Details of program 90 may differ depending what kind of device 80 (e.g., seeking entity 32, CA 34, web client 36, and notary 38) it is running on. When program 90 is executed by processor 84, device 80 performs one or more methods, as described below in connection with FIGS. 3 and 4.

In some embodiments, a device 80 also includes a user interface (not depicted). The user interface may include, for example, one or more of a display screen, a touch-sensitive display screen, a printer, a speaker, a keyboard, a mouse, a trackpad, a controller for one of the above, similar devices, etc. In particular, web client 36 includes a user interface for displaying a web page received from seeking entity 32 and for receiving user commands.

Having described the various systems, apparatuses, and associated constructs of and used in conjunction with various embodiments, this Description will now turn to describing various method embodiments which may be performed in conjunction with the above-described systems, apparatuses, and associated constructs.

Figure 3:
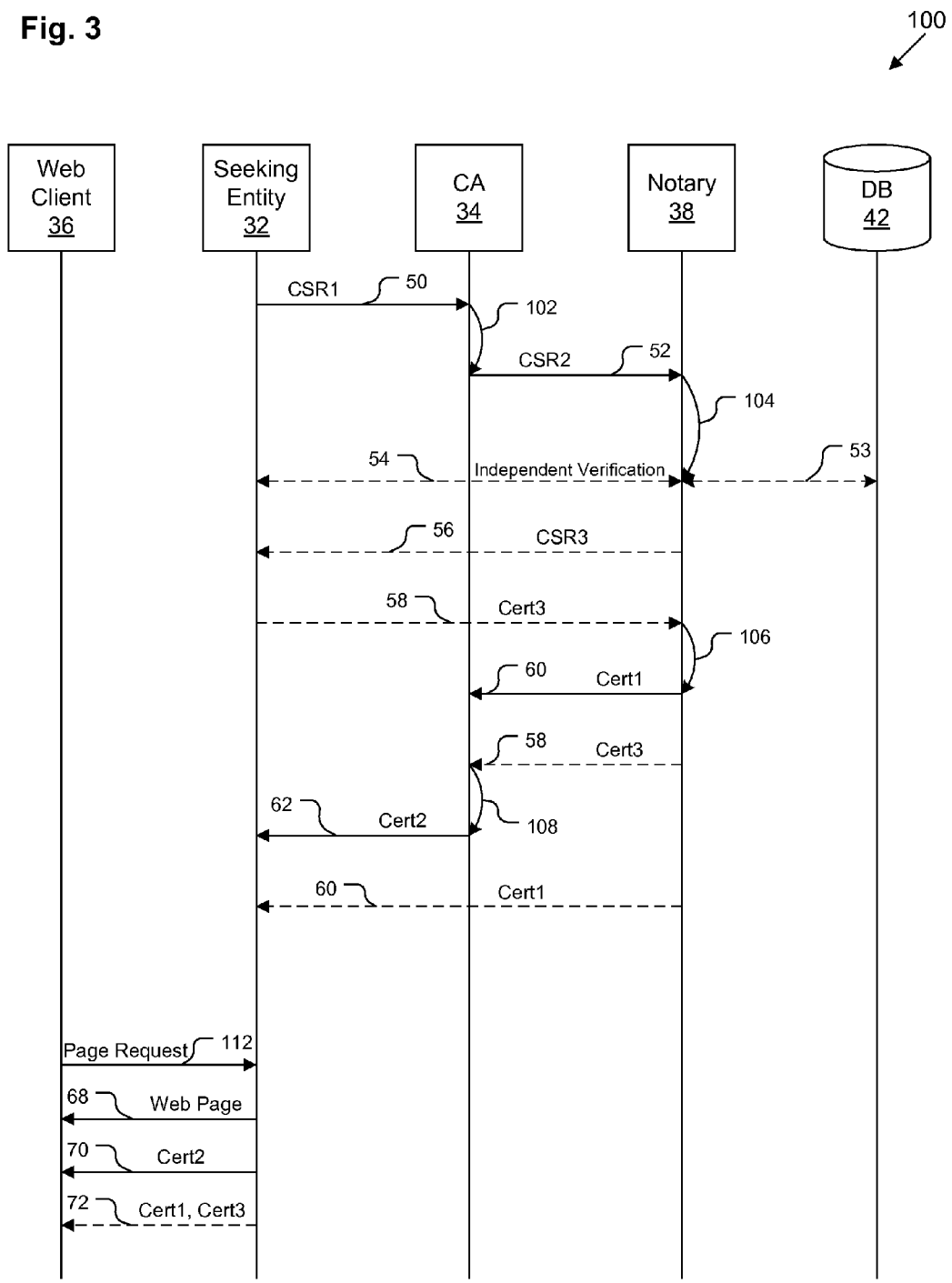
FIG. 3 illustrates an example method according to various embodiments.

FIG. 3 depicts an example method 100 performed by various devices 80 within system 30. Typically each device 80 performs aspects of the method 100 by executing its respective program 90 on processor 84.

As depicted, seeking entity 32 sends CSR1 50 to a CA 34 in order to get a digital certificate to be used for communications with web client 36. Program 90 of seeking entity 32 generates a public key/private key pair (or in some embodiments, the pair of keys may already exist), stored as data 92, and creates a certificate request information object (CRI), stored as data 92. Program 90 inserts a distinguished name (e.g., the domain name of the seeking entity 32, such as www.example.com) and the public key within CRI. Program 90 also inserts various organizational contact information (such as, for example, a contact e-mail address, telephone number, name of a system administrator, etc.) into an optional attribute field of the CRI. Program 90 then creates a digital signature by applying its private key to the CRI and stores the digital signature as well as the CRI within CSR1 50, prior to sending CSR1 50 to CA 34.

Upon receiving CSR1 50, program 90 of CA 34 performs a verification procedure 102 in order to achieve domain validation of the seeking entity 32. Upon successfully domain validating the seeking entity 32 and its CSR1 50, program 90 of CA 34 embeds CSR1 within a new CSR, CSR2 52, and sends CSR2 52 to a notary 38. In some embodiments, program 90 does this by inserting CSR1 50 within an optional attribute field of a new CRI, inserting a public key of the CA 34 within the CRI, signing the CRI using a private key stored by CA 34 paired with that public key, and packaging the CRI and digital signature within CSR2 52. In certain other embodiments, program 90 of CA 34 may instead first create a digital certificate by signing CSR1 with its private key and then embed the newly-created certificate (which includes the relevant information from CSR1) within the CRI either instead of or in addition to the CSR1. It should be noted that, in these certain embodiments, the newly-created certificate must bear a second signature (which will ultimately be provided by the notary 38) to be considered valid by an enhanced web client 36. Typically, at this stage, CA 34 requests an assignment of a random notary 38 from notarization pool, the randomly assigned notary 38(*a*) being guaranteed to be under separate control from the CA 34. Upon being assigned a particular notary 38(*a*), CA sends the CSR2 50 to notary 38(*a*). Random assignment of notary 38(*a*) enhances security by making it difficult for a hacker to hack into both CA 34 and notary 38.

Upon receiving CSR2 52, program 90 of notary 38 performs an independent verification procedure 104 in order to further verify the identity of the seeking entity 32.

In some embodiments, verification procedure 104 merely includes a domain validation of the seeking entity 32 performed independently of verification procedure 102. In these embodiments, notary 38 functions as a second chained CA 34, and, upon successfully domain validating the seeking entity 32 and its CSR1 50, program 90 of notary 38 generates cert1 60 and sends it to CA 34. In embodiments in which CSR2 52 includes a certificate signed by CA 34, program 90 of notary 38 appends its own signature to the received certificate, thereby creating cert1 60, which is an improved double-signature certificate different than a convention certificate that bears only a single signature. In embodiments in which CSR2 52 does not include a certificate signed by CA 34, program 90 of notary 38 creates cert1 60 by digitally signing CSR2.

In other embodiments, verification procedure 104 also includes program 90 of notary 38 querying DB 42 for all contact addresses previously used by entities having the same distinguished name as indicated by CSR1 50. At this stage, program 90 of notary 38 may evaluate whether the contact e-mail address within CSR1 50 is the same as any of the previously-used contact addresses received from DB 42. In one embodiment, if the contact e-mail address within CSR1 50 is new, verification procedure 104 results in a failure. In other embodiments, program 90 of notary 38 generates a list of addresses to check by including both the contact e-mail address within CSR1 50, if it is new, as well as all of the previously-used contact addresses received from DB 42. In another embodiment, the contact e-mail address within CSR1 50 is excluded from the list of addresses if it is new.

In other embodiments, notary 38 does not query DB 42 for the previously-used addresses, but, instead, just places the contact e-mail address within CSR1 50 in the list of addresses to check.

At this stage, verification procedure 104 continues with one of two approaches. In a first embodiment, program 90 of notary 38 engages in an independent verification communication 54 with all contact addresses on the list of addresses to check. Typically this involves sending an e-mail message to each address on the list (one or more addresses) indicating that CSR1 was recently received by CA 34. In some embodiments, a confirmation must be received in response to each such message in order for the verification procedure 104 to succeed, while in other embodiments, verification procedure 104 succeeds as long as no negative responses are received within a timeout period (e.g., one business day).

In a second embodiment, program 90 of notary 38 embeds CSR2 within a new CSR, CSR3 56, and sends CSR3 56 to all contact addresses on the list of addresses to check. Program 90 of notary 38 does this by inserting CSR2 52 within an optional attribute field of a new CRI, inserting a public key of the notary 38 within the CRI, signing the CRI using a private key stored by notary 38 paired with that public key, and packaging the CRI and digital signature within CSR3 56. Upon receiving CSR3 56, program 90 of seeking entity 32 verifies that it sent CSR1 50 to CA 34 and that CSR3 56 was sent by a valid notary 38, and then signs CSR3 56, thereby creating cert3 58, which it sends back to notary 38. In some embodiments, cert3 58 must be received in response to each CSR3 56 (sent to every contact address on the list of addresses to check) in order for the verification procedure 104 to succeed, while in other embodiments, verification procedure 104 succeeds as long as at least one cert3 58 is received and no negative responses are received within a timeout period (e.g., one business day).

Once verification procedure 104 succeeds, program 90 of notary 38 performs a certificate creation step 106. In certificate creation step 106, in embodiments in which CSR2 52 includes a certificate signed by CA 34, program 90 of notary 38 appends its own signature to the received certificate, thereby creating cert1 60. In embodiments in which CSR2 52 does not include a certificate signed by CA 34, program 90 of notary 38 creates cert1 60 by digitally signing CSR2.

Subsequently, program 90 of notary 38 sends cert1 60 to CA 34.

In embodiments in which program 90 of notary 38 is configured to receive cert3 58 from seeking entity 32, program 90 of notary 38 also sends cert3 58 to CA 34 (in addition sending cert1 60, as mentioned previously) and program 90 of notary 38 also sends cert1 60 to seeking entity 32.

Upon receiving cert1 60 from notary 38 (and, in embodiments in which program 90 of notary 38 is configured to receive cert3 58 from seeking entity 32, only upon also receiving cert3 58 from notary 38), program 90 of CA 34 performs a certificate creation step 108. In certificate creation step 108, in embodiments in which cert1 60 is a version of CSR2 52 signed by notary 38, program 90 of CA 34, upon verifying the signature of notary 38 on cert1 60, signs CSR1 to create cert2 62. In embodiments in which cert1 60 is a version of CSR1 50 signed by both CA 34 and notary 38, cert2 62 is just set to equal cert1 60 without modification.

Upon successfully creating cert2 62 in certificate creation step 108, program 90 of CA 34 sends cert2 62 to seeking entity 32.

Having successfully received cert2 62 (and, in some embodiments, also having received cert1 60 and already being in possession of cert3), seeking entity 32 is now able to securely communicate with web client 36. When web client 36 sends a web page request 112 to seeking entity 32 using HTTPS, seeking entity 32 and web client 36 engage in a TLS handshake procedure, seeking entity 32 presenting a primary certificate 70 to web client 36, which allows them, through a key negotiation procedure, to establish a shared key that can be used to encrypt or further derive encryption keys with which to encrypt the requested data. Seeking entity 32 responds by encrypting the web page using the agreed-upon shared key to create an encrypted web page 68 and then sending encrypted web page 68 to web client 36. In the case of method 100, primary certificate 70 is cert2 62. Primary certificate 70, 62 stores the public key of seeking entity 32, which web client 36 can use in the key negotiation procedure to establish the shared key, provided that primary certificate 70, 62 is signed by a valid CA 34. In some embodiments, in addition to checking to make sure that primary certificate 70, 62 is signed by a CA 34, web client 36 also verifies that primary certificate 70, 62 bears a second signature from a notary 38. In other embodiments, seeking entity 32, in addition to just sending primary certificate 70, 62, also sends one or more additional certificates 72. Additional certificate 72 may include cert1 60, and in some embodiments also cert3 58. In these embodiments web client 36 also verifies that cert1 60 is signed by a notary 38, and when cert3 58 is also sent, web client 36 also verifies that cert3 58 is signed by the seeking entity 32 itself, using the public key of the seeking entity 32 from cert2 62.

It should be understood that, embodiments in which web client 36 only verifies the single signature of CA 34 from cert2 62 without also receiving either cert1 60 or cert3 58, are typically limited to cases in which web client 36 runs a legacy browser that is only capable of receiving a single certificate for any given page, the single certificate being limited to having one signature. Such embodiments are less preferable, since, although they protect against certain simplistic hacking attacks on CA 34, they cannot protect against hacking attacks in which CA 34 is fully controlled by a hacker who is able to cause CA 34 to generate a signature for cert2 without first receiving cert1 60 from a notary. Thus, web clients 36 running improved browsers are preferred, so that the web client 36 can make independent verification of signatures by both the CA 34 and the notary 38.

Figure 4:
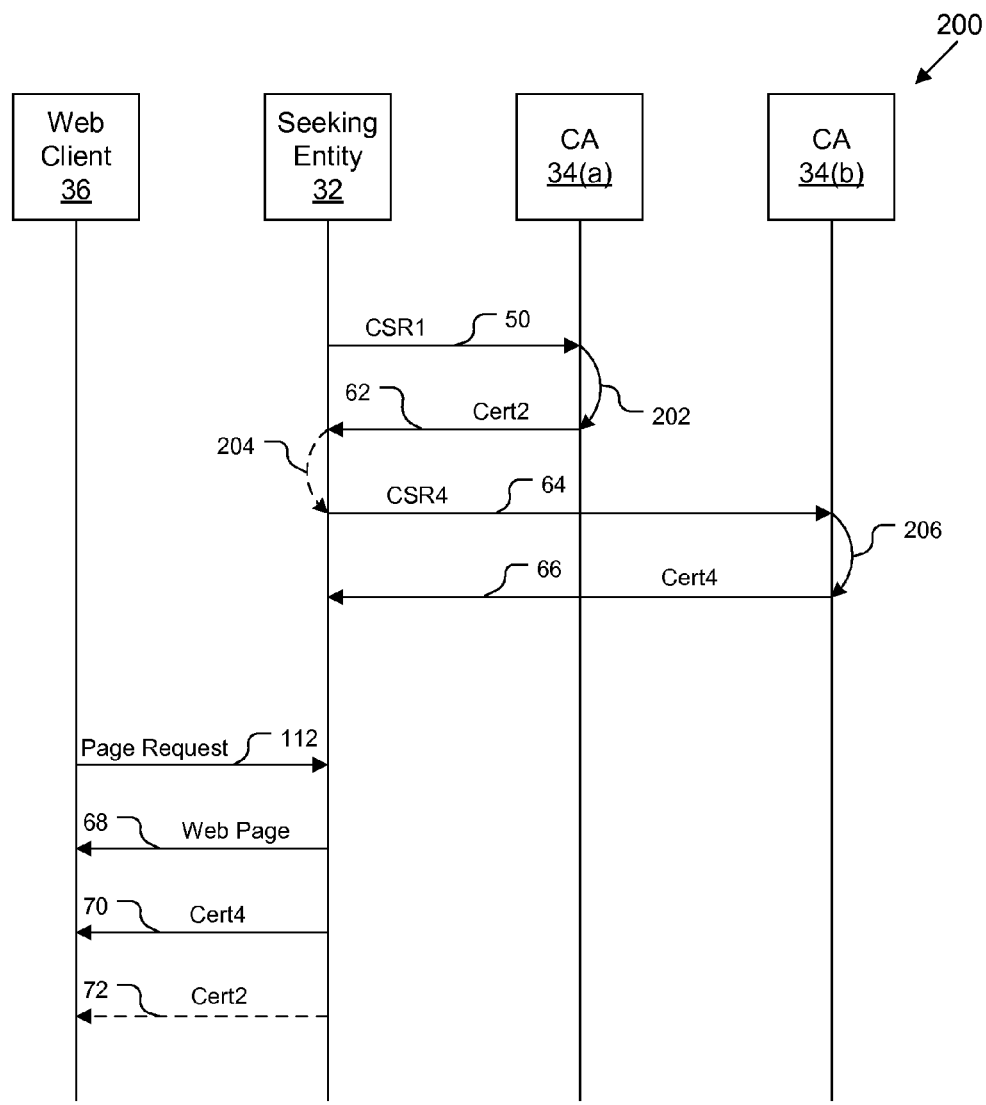
FIG. 4 illustrates an example method according to various embodiments.

FIG. 4 depicts an alternate example method 200 performed by various devices 80 within system 30. Typically each device 80 performs aspects of the method 200 by executing its respective program 90 on processor 84.

As depicted, seeking entity 32 sends CSR1 50 to a first CA 34(a) in order to get a digital certificate to be used for communications with web client 36. Program 90 of seeking entity 32 generates a public key/private key pair (or in some embodiments, the pair of keys may already exist), stored as data 92, and creates a CRI, stored as data 92. Program 90 inserts a distinguished name (e.g., the domain name of the seeking entity 32, such as www.example.com) and the public key within CRI. Program 90 then creates a digital signature by applying its private key to the CRI and stores the digital signature as well as the CRI within CSR1 50, prior to sending CSR1 50 to CA 34(a).

Upon receiving CSR1 50, program 90 of CA 34(a) performs a verification procedure 202 in order to achieve domain validation of the seeking entity 32. Upon successfully domain validating the seeking entity 32 and its CSR1 50, program 90 of CA 34(a) signs CSR1 to create cert2 62, which it then sends to seeking entity 32.

Upon receiving cert2 62, program 90 of seeking entity 32 optionally performs a transformation operation 204. In optional transformation operation 204, performed in some embodiments, program 90 of seeking entity 32 embeds cert2 62 within the optional attribute field of a CRI and uses that CRI to construct a new CSR, CSR4 64, having cert2 62 embedded therein.

In other embodiments, program 90 of seeking entity 32 generates CSR4 64 in the same way that it generated CSR1 50.

Upon generating CSR4 64, program 90 of seeking entity 32 sends CSR4 64 to a second CA 34(b). Upon receiving CSR4 64, program 90 of second CA 34(b) performs an independent verification procedure 206 in order to achieve domain validation of the seeking entity 32. In embodiments in which CSR4 64 includes embedded cert2 62, program 90 of second CA 34(b) appends its own signature to cert2 62, thereby creating cert4 66. In embodiments in which CSR4 64 does not include embedded cert2 62, program 90 of second CA 34(*b*) creates cert4 66 by digitally signing CSR4.

Having successfully received cert2 62 and cert4 66, seeking entity 32 is now able to securely communicate with web client 36. When web client 36 sends a web page request 112 to seeking entity 32 using HTTPS, seeking entity 32 and web client 36 engage in a TLS handshake procedure, seeking entity 32 presenting a primary certificate 70 to web client 36, which allows them, through a key negotiation procedure, to establish a shared key that can be used to encrypt or further derive encryption keys with which to encrypt the requested data. Seeking entity 32 responds by encrypting the web page using the agreed-upon shared key to create an encrypted web page 68 and then sending encrypted web page 68 to web client. In the case of method 200, primary certificate 70 is cert4 66. Primary certificate 70, 66 stores the public key of seeking entity 32, which web client 36 can use in the key negotiation procedure to establish the shared key, provided that primary certificate 70, 66 is signed by a valid CA 34(*b*). In some embodiments, in addition to checking to make sure that primary certificate 70, 66 is signed by a CA 34(*b*), web client 36 also verifies that primary certificate 70, 66 bears a second signature from CA 34(*a*). In other embodiments, seeking entity 32, in addition to just sending primary certificate 70, 66, also sends additional certificate 72, which, in this case, is cert2 62. In these embodiments web client 36 also verifies that cert2 62 is signed by CA 34(*a*).

Thus, various techniques have been provided for requiring multiple independent verifications of the identity of an entity seeking a digital certificate. Thus, even if a hacker is able to hack into one CA 34(*a*), a second verification performed by a different entity 34(*b*), 38(*a*) will prevent the hacker from using the CA 34(*a*) to generate counterfeit certificates. In some embodiments, a notary 38 is used to independently verify the identity of an entity requesting a certificate before a CA 34 is able to generate the certificate. In other embodiments, multiple CAs 34(*a*), 34(*b*) are used to generate multiple certificates, while in yet other embodiments, multiple CAs 34(*a*), 34(*b*) are used to generate certificates with multiple signatures. In some embodiments, a notary 38 is able to directly contact the legitimate administrator of the web site with reference to contact information previously stored with respect to the web site in order to prevent a hacker from changing the contact information for the web site.

While various embodiments of the present disclosure have been particularly shown and described, it will be understood by those skilled in the art that various changes in form and details may be made therein without departing from the spirit and scope of the present disclosure as defined by the appended claims.

It should be understood that although various embodiments have been described as being methods, software embodying these methods is also included. Thus, one embodiment includes a tangible non-transitory computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method performed by a computing device, the method comprising:

receiving, at the computing device, a first certificate signing request (1CSR) from a certificate authority (CA), the 1CSR including an embedded second certificate signing request (2CSR), the 2CSR having been received by the CA from an entity seeking a signed certificate from the CA that validates an identity claim made by the entity in the 2CSR, the CA having performed a preliminary verification of the 2CSR prior to embedding it in the 1CSR;

verifying, at the computing device, that the 1CSR came from the CA;

performing a verification procedure on the embedded 2CSR at the computing device independent of the preliminary verification performed by the CA, to validate the identity claim made by the entity in the 2CSR; and upon successfully validating the identity claim made by the entity in the 2CSR, sending a certificate from the computing device to the CA, the certificate validating the identity claim made by the entity in the 2CSR.

2. The method of claim 1 wherein performing the verification procedure on the embedded 2CSR at the computing device independent of the preliminary verification performed by the CA includes comparing a first entity contact address provided within the 2CSR to a second entity contact address previously used by an entity making the same identity claim, the second entity contact address being stored within a database maintained by the computing device in conjunction with other computing devices configured to perform independent verification procedures on embedded certificate requests.

3. The method of claim 2 wherein performing the verification procedure on the embedded 2CSR at the computing device independent of the preliminary verification performed by the CA further includes, if the first entity contact address and the second entity contact address differ, refraining from sending the certificate from the computing device to the CA.

4. The method of claim 2 wherein performing the verification procedure on the embedded 2CSR at the computing device independent of the preliminary verification performed by the CA further includes:

sending a query to the first entity contact address to ensure that the 2CSR was actually issued by the entity; and if the first entity contact address and the second entity contact address differ, sending a query to the second entity contact address to ensure that contact information for the entity was not fraudulently changed.

5. The method of claim 2 wherein:

performing the verification procedure on the embedded 2CSR at the computing device independent of the preliminary verification performed by the CA further includes:

sending a third certificate request (3CSR) to the first entity contact address to ensure that the 2CSR was actually issued by the entity, the 3CSR including the 1CSR embedded therein;

refraining from validating the identity claim made by the entity in the 2CSR unless the computing device receives a response certificate signed by the entity in response to sending the 3CSR; and if the first entity contact address and the second entity contact address differ:

sending a fourth certificate request (4CSR) to the second entity contact address to ensure that contact information for the entity was not fraudulently changed, the 4CSR including the 1CSR embedded therein; and refraining from validating the identity claim made by the entity in the 2CSR unless the computing device receives an identical response certificate signed by the entity in response to sending the 4CSR; and sending the certificate from the computing device to the CA includes:

digitally signing the 2CSR at the computing device to create a notarization certificate; and sending the response certificate and the notarization certificate from the computing device to the CA.

6. The method of claim 1 wherein:

performing the verification procedure on the embedded 2CSR at the computing device independent of the preliminary verification performed by the CA includes:

sending a third certificate request (3CSR) to the first entity contact address to ensure that the 2CSR was actually issued by the entity, the 3CSR including the 1CSR embedded therein;

refraining from validating the identity claim made by the entity in the 2CSR unless the computing device receives a response certificate signed by the entity in response to sending the 3CSR; and sending the certificate from the computing device to the CA includes:

digitally signing the 2CSR at the computing device to create a notarization certificate; and sending the response certificate and the notarization certificate from the computing device to the CA.

7. The method of claim 6 wherein the method further comprises sending the notarization certificate to the first entity contact address.

8. The method of claim 1 wherein:

receiving the 1CSR from the CA includes receiving a preliminarily-signed certificate embedded within the 1CSR, the preliminarily-signed certificate validating the identity claim made by the entity in the 2CSR, the preliminarily-signed certificate being signed by the CA; and sending the certificate from the computing device to the CA includes appending, at the computing device, a second signature to the preliminarily-signed certificate, thereby forming the certificate to be sent to the CA.

9. The method of claim 1 wherein sending the certificate from the computing device to the CA includes signing, at the computing device, the 1CSR, thereby forming the certificate to be sent to the CA, the certificate serving to authorize the CA to sign the 1CSR in order to send the signed 1CSR back to the entity.

10. A computing device comprising:

a network interface;

memory; and a processor, the processor being configured to execute instructions stored in memory in order to:

receive, via the network interface, a first certificate signing request (1CSR) from a certificate authority (CA), the 1CSR including an embedded second certificate signing request (2CSR), the 2CSR having been received by the CA from an entity seeking a signed certificate from the CA that validates an identity claim made by the entity in the 2CSR, the CA having performed a preliminary verification of the 2CSR prior to embedding it in the 1CSR;

verify that the 1CSR came from the CA;

perform a verification procedure on the embedded 2CSR at the computing device independent of the preliminary verification performed by the CA, to validate the identity claim made by the entity in the 2CSR; and upon successfully validating the identity claim made by the entity in the 2CSR, send a certificate from the computing device to the CA, the certificate validating the identity claim made by the entity in the 2CSR.

11. A method performed by a computing device, the method comprising:

receiving, at the computing device, a first certificate signing request (1CSR) from an entity seeking a signed certificate from the computing device that validates an identity claim made by the entity in the 1CSR;

performing, at the computing device, a preliminary verification of the 1CSR by:

determining whether a signature provided within the 1CSR by the entity was signed by a private key paired with a public key provided within the 1CSR; and determining whether the identity claim is valid based on a distinguished name included within the 1CSR;

in response to determining that the signature was signed by the private key paired with the public key and that the identity claim is valid based on the distinguished name, sending, from the computing device to a notarization entity, a second certificate signing request (2CSR), the 2CSR having the 1CSR embedded therein;

in response to sending the 2CSR to the notarization entity, receiving, at the computing device, a notarization certificate signed by the notarization entity; and in response to receiving the notarization certificate signed by the notarization entity, sending a signed certificate from the computing device, to the entity, the signed certificate validating the identity claim made by the entity in the 1CSR.

12. The method of claim 11 wherein:

receiving the notarization certificate includes receiving a version of the 2CSR signed by the notarization entity; and sending the signed certificate to the entity includes signing, at the computing device, the 1CSR, thereby forming the signed certificate.

13. The method of claim 11 wherein:

receiving the notarization certificate includes:

receiving, at the computing device, a version of the 2CSR signed by the notarization entity; and receiving, at the computing device, from the notarization entity, another certificate, the other certificate having been signed by the entity; and sending the signed certificate to the entity includes signing the 1CSR, at the computing device, thereby forming the signed certificate.

14. The method of claim 11 wherein:

sending the 2CSR to the notarization entity, the 2CSR having the 1CSR embedded therein, includes:

signing the 1CSR at the computing device;

embedding, at the computing device, the signed 1CSR within the 2CSR; and sending the 2CSR from the computing device to the notarization entity with the embedded signed 1CSR;

receiving the notarization certificate includes receiving, at the computing device, a version of the signed 1CSR also signed by the notarization entity; and sending the signed certificate to the entity includes sending the notarization certificate from the computing device to the entity.

15. The method of claim 11 wherein sending the 2CSR to the notarization entity includes requesting that a random notarization entity be selected from a pool of notarization entities.

* * * * *